United States Patent
Yano

(10) Patent No.: US 11,558,598 B2
(45) Date of Patent: Jan. 17, 2023

(54) CONTROL APPARATUS AND CONTROL METHOD FOR SAME

(71) Applicant: CANON KABUSHIKI KAISHA, Tokyo (JP)

(72) Inventor: Tomohiro Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/182,416

(22) Filed: Feb. 23, 2021

(65) Prior Publication Data

US 2021/0176450 A1  Jun. 10, 2021

Related U.S. Application Data

(63) Continuation of application No. PCT/JP2019/033550, filed on Aug. 27, 2019.

(30) Foreign Application Priority Data

Sep. 6, 2018 (JP) .............................. JP2018-167210

(51) Int. Cl.
  *H04N 13/279* (2018.01)
  *H04N 13/293* (2018.01)
  *H04N 13/282* (2018.01)

(52) U.S. Cl.
  CPC ......... *H04N 13/279* (2018.05); *H04N 13/282* (2018.05); *H04N 13/293* (2018.05)

(58) Field of Classification Search
  USPC .......................................................... 348/52
  See application file for complete search history.

(56) References Cited

U.S. PATENT DOCUMENTS

| | | | | |
|---|---|---|---|---|
| 6,226,008 B1 * | 5/2001 | Watanabe | ............... | G06T 15/20 345/427 |
| 8,797,360 B2 * | 8/2014 | Shinohara | ............... | G06T 19/00 345/650 |
| 10,529,122 B2 * | 1/2020 | Maruyama | ............. | H04N 5/247 |
| 2012/0307020 A1 * | 12/2012 | Hirano | ................. | H04N 5/2226 348/E13.074 |
| 2018/0204381 A1 * | 7/2018 | Kanatsu | ................ | G06T 19/003 |
| 2020/0312014 A1 | 10/2020 | Yano | | |

(Continued)

FOREIGN PATENT DOCUMENTS

| | | | |
|---|---|---|---|
| JP | 2004-341572 A | 12/2004 | |
| JP | 2007-195091 A | 8/2007 | |
| JP | 2007195091 A * | 8/2007 | ........... H04N 13/243 |

(Continued)

OTHER PUBLICATIONS

International Search Report issued in International Application No. PCT/JP2019/033550 dated Nov. 19, 2019, pp. 1-2, English Translation.

*Primary Examiner* — Behrooz M Senfi

(74) *Attorney, Agent, or Firm* — Carter, DeLuca & Farrell LLP

(57) ABSTRACT

A control apparatus which controls a virtual camera according to a user operation related to an operation of the virtual camera, when the control apparatus accepts the user operation, determines whether or not to restrict moving of the virtual camera according to the accepted user operation depending on whether or not a predetermined condition for the virtual camera is fulfilled.

22 Claims, 12 Drawing Sheets

(56) References Cited

U.S. PATENT DOCUMENTS

2020/0336719 A1* 10/2020 Morisawa ............. G06T 15/205

FOREIGN PATENT DOCUMENTS

| JP | 5174522 B2 * | 4/2013 | ............. A63F 13/10 |
| JP | 2015-114716 A | 6/2015 | |
| JP | 2017-516567 A | 6/2017 | |
| JP | 2017-212592 A | 11/2017 | |
| JP | 2018167210 A * | 11/2018 | ............... B01D 3/14 |
| WO | WO-2009128181 A1 * | 10/2009 | ............. A63F 13/10 |
| WO | 2015/184187 A | 12/2015 | |

* cited by examiner

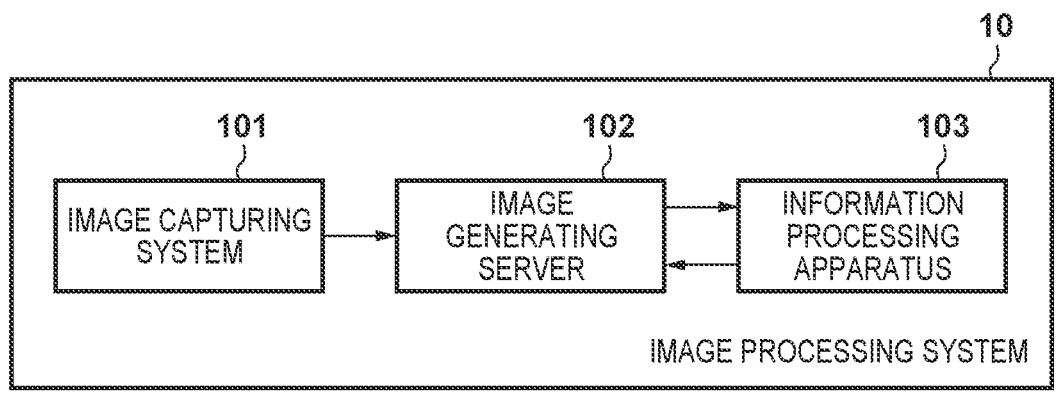
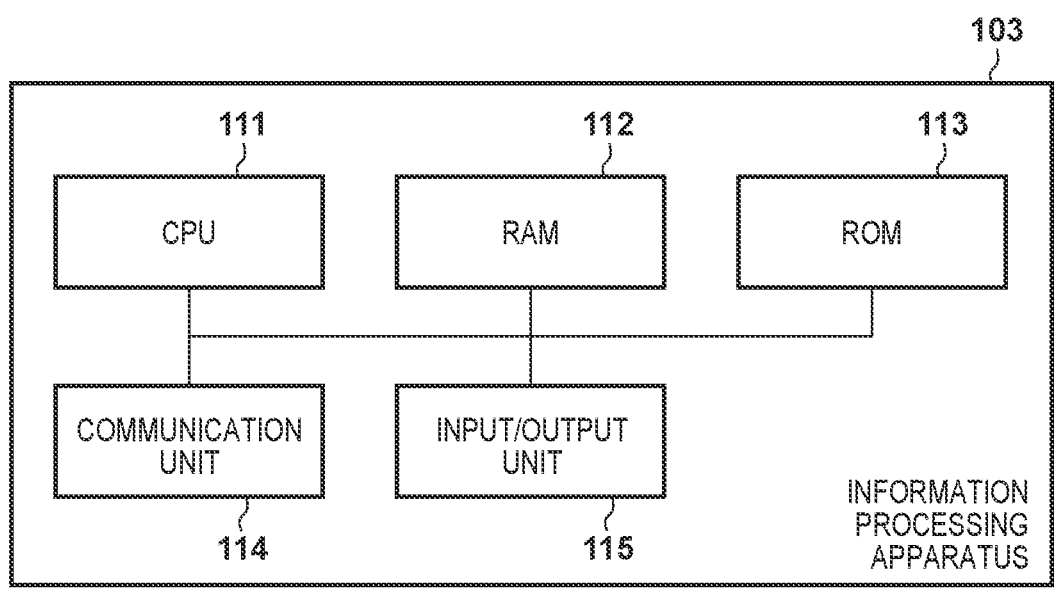

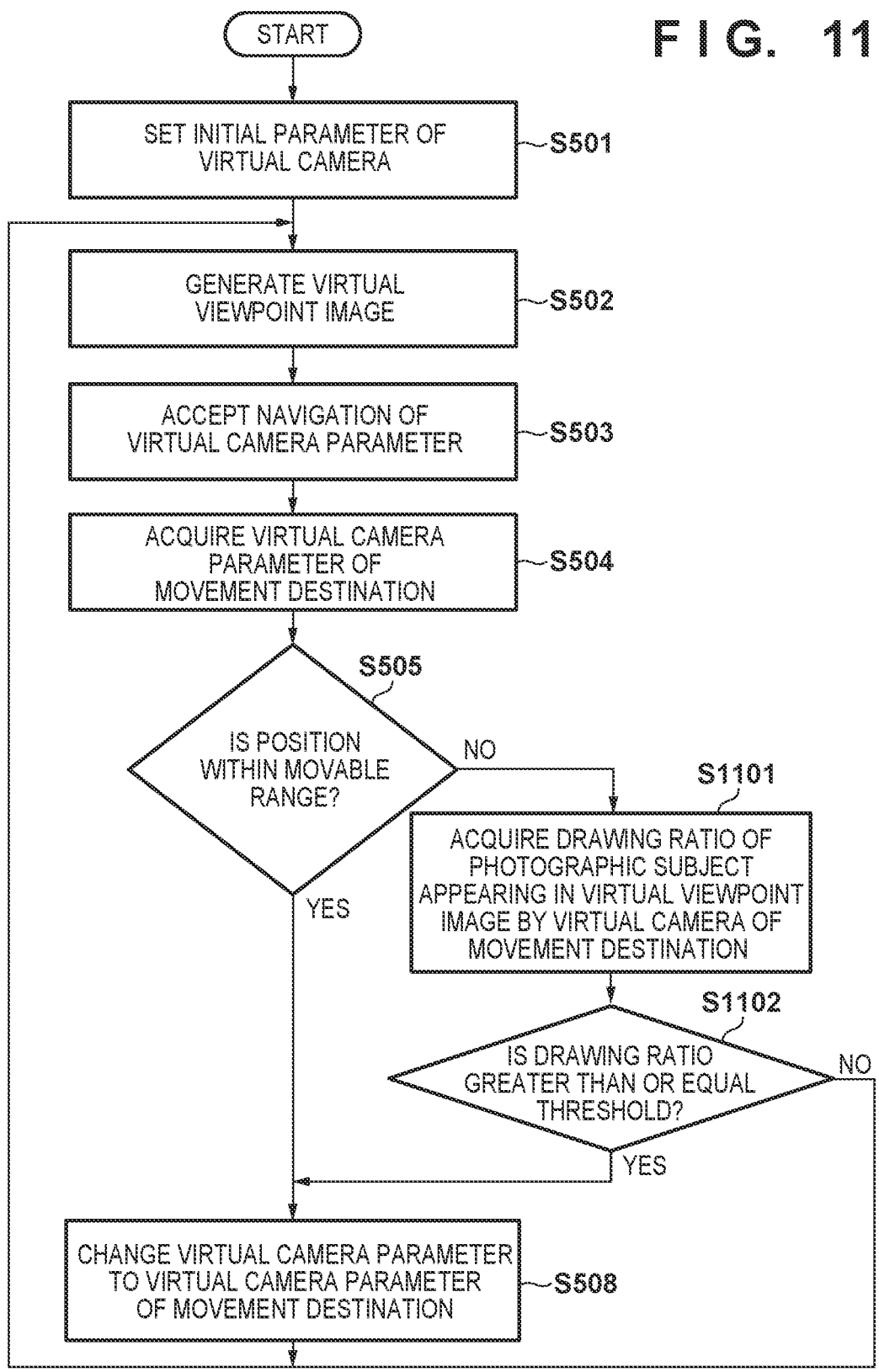

CONTROL APPARATUS AND CONTROL METHOD FOR SAME

CROSS-REFERENCE TO RELATED APPLICATIONS

This application is a Continuation of International Patent Application No. PCT/JP2019/033550, filed Aug. 27, 2019, which claims the benefit of Japanese Patent Application No. 2018-167210, filed Sep. 6, 2018, both of which are hereby incorporated by reference herein in their entirety.

BACKGROUND OF THE INVENTION

Field of the Invention

The present invention relates to a control apparatus for controlling a virtual viewpoint, and a control method for the control apparatus.

Background Art

In recent years, a technique of synchronously capturing images from multiple viewpoints by installing a plurality of cameras at different positions, and using the multiple viewpoint images obtained by capturing images in such a manner to generate not only images from the positions where the cameras are installed but also a virtual viewpoint image from an arbitrarily defined viewpoint is attracting attention. The generation and viewing of a virtual viewpoint image based on multiple viewpoint images can be realized by collecting images captured by a plurality of cameras to an image processing unit such as a server, applying processing such as rendering based on the virtual viewpoint in the image processing unit, and displaying the virtual viewpoint image on a user terminal.

In a service in which a virtual viewpoint image is used as described above, content from a gripping viewpoint can be created by an image creator from captured images of a soccer or basketball game, for example. Furthermore, a user viewing the content can also watch the game while freely moving the viewpoint, and the realistic sensation that the user feels is stronger compared to that with conventional captured images. PTL1 discloses a technique in which a history of operations performed by other users in the past is retained and presented to a user.

CITATION LIST

Patent Literature

PTL1: Japanese Patent Laid-Open No. 2017-516567

However, while the technique disclosed in PTL1 provides assistance regarding the operation of a virtual viewpoint image by presenting operations performed in the past to a user, the technique disclosed in PTL1 cannot assist the operation actually carried out by the user. Furthermore, the execution of an operation for creating an image that cannot be acquired by real cameras, such as that for displaying the performance of a player on the ground as observed from under the ground, from behind spectator seats, from the outside the ceiling of a domed stadium, etc., in the generation of a virtual viewpoint image may result in losing track of the virtual camera position and orientation.

In order to avoid the risk of losing track of the virtual camera position and orientation in such a manner, the idea of imposing a constraint on the operation of the virtual camera can be conceived. For example, the idea of constraining a user operation that would result in the virtual camera moving outside a prescribed range can be conceived. On the other hand, if such a constraint is imposed, the flexibility of operation of the virtual viewpoint would be sacrificed. Consequently, the constraint imposed on the operation of the virtual camera would inhibit the generation of virtual viewpoint images based on intriguing camera paths.

SUMMARY OF THE INVENTION

One aspect of the present invention provides a technique that allows a virtual camera to be operated beyond a constraint while reducing the possibility of losing track of the virtual camera position and orientation.

According to one aspect of the present invention, there is provided a virtual camera control apparatus comprising: an acceptance unit configured to accept input for moving a virtual viewpoint corresponding to a virtual viewpoint image; and a control unit configured to control the virtual viewpoint in accordance with input accepted by the acceptance unit, the control unit being configured to move the virtual viewpoint to the outside of a predetermined setting region in accordance with input for moving the virtual viewpoint from the inside to the outside of the setting region if the direction of the virtual viewpoint is within a specific range, and restrict movement of the virtual viewpoint in accordance with the input for moving the virtual viewpoint from the inside to the outside of the setting region if the direction of the virtual viewpoint is not within the specific range.

According to another aspect of the present invention, there is provided a control method comprising: accepting input for moving a virtual viewpoint corresponding to a virtual viewpoint image; moving the virtual viewpoint to the outside of a predetermined setting region in accordance with input for moving the virtual viewpoint from the inside to the outside of the setting region if the direction of the virtual viewpoint is within a specific range; and restricting movement of the virtual viewpoint in accordance with the input for moving the virtual viewpoint from the inside to the outside of the setting region if the direction of the virtual viewpoint is not within the specific range.

According to another aspect of the present invention, there is provided a computer-readable storage medium storing a computer program for causing a computer to perform a control method comprising: accepting input for moving a virtual viewpoint corresponding to a virtual viewpoint image; moving the virtual viewpoint to the outside of a predetermined setting region in accordance with input for moving the virtual viewpoint from the inside to the outside of the setting region if the direction of the virtual viewpoint is within a specific range; and restricting movement of the virtual viewpoint in accordance with the input for moving the virtual viewpoint from the inside to the outside of the setting region if the direction of the virtual viewpoint is not within the specific range.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1A is a block diagram illustrating an example of an overall configuration of an image processing system in the embodiments.

FIG. 1B is a block diagram illustrating an example of a hardware configuration of an information processing apparatus.

FIG. 8, 8a is a schematic diagram illustrating a vector indicating the direction of a movement-destination virtual camera and a vector of a normal line of a boundary surface of a movable range, and 8b is a schematic diagram illustrating an angle between the two vectors illustrated in 8a.

FIG. 9, 9a is a schematic diagram illustrating a vector indicating the direction of a movement-destination virtual camera and the vector of the normal line of the boundary surface of the movable range, and 9b is a schematic diagram illustrating an angle between the two vectors illustrated in 9a.

FIG. 11 is a flowchart illustrating processing in the image processing system based on a second embodiment.

DESCRIPTION OF EMBODIMENTS

Figure 1C:
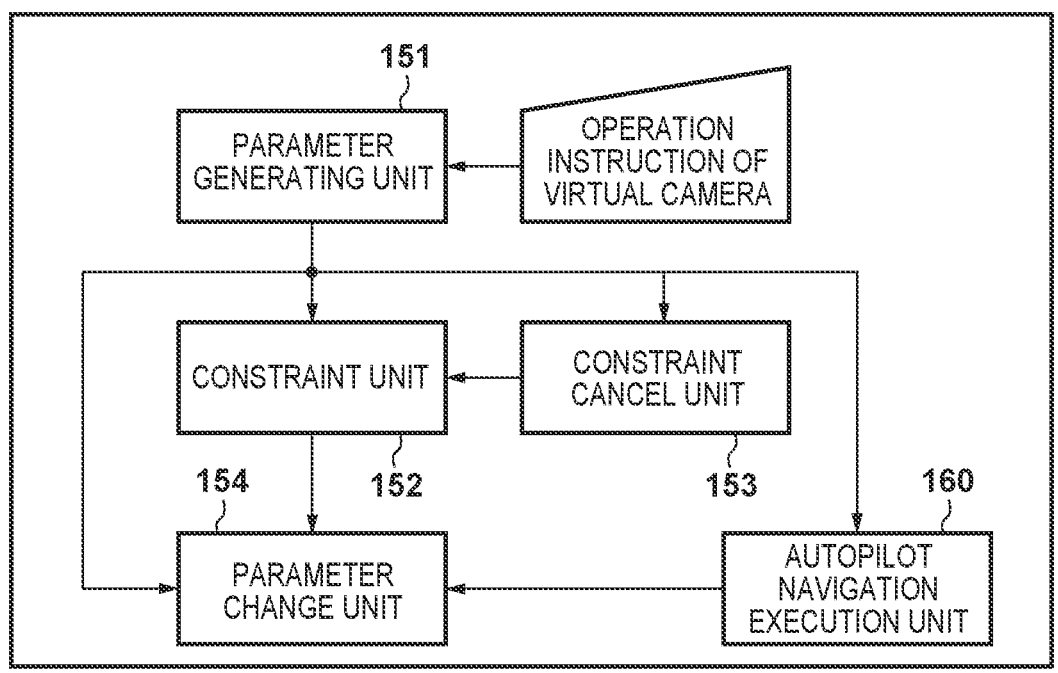
FIG. 1C is a block diagram illustrating an example of a functional configuration of the information processing apparatus.

In the following, embodiments of the present invention will be described with reference to the drawings.

First Embodiment

FIG. 1A is a diagram describing an overall configuration of an image processing system 10 based on a first embodiment. The image processing system 10 includes an image capturing system 101, an image generating server 102, and an information processing apparatus 103. The image processing system 10 can generate virtual viewpoint images. In the image capturing system 101, a plurality of image capturing devices (cameras) are arranged at different positions, and a plurality of images from multiple viewpoints are synchronously captured. The image capturing system 101 transmits the plurality of images synchronously captured from the multiple viewpoints to the image generating server 102.

Based on the plurality of images synchronously captured from the multiple viewpoints, the image generating server 102 generates a virtual viewpoint image as seen from a virtual camera. A virtual camera is an imaginary camera that can move freely inside an image capturing space. By using the virtual camera, an image as seen from a viewpoint differing from that of any camera included in the image capturing system 101, i.e., a virtual viewpoint image, can be captured. The viewpoint of the virtual camera (virtual viewpoint) is indicated by camera parameters that are determined by the later-described information processing apparatus 103. The image generating server 102 sequentially generates virtual viewpoint images from the plurality of images that are received. That is, the image generating server 102 can generate a live virtual viewpoint image. Note that the live virtual viewpoint image that the image processing system 10 can generate is a virtual viewpoint image based on images captured by the image capturing system 101 at a time that can be obtained by taking into account the processing delay in the image processing system 10 and the image generating server 102 in relation to the current time.

Furthermore, the image generating server 102 includes a database, and has the function of recording the plurality of images that are received. From the plurality of images recorded in the database, the image generating server 102 can generate a past virtual viewpoint image, i.e., a replay virtual viewpoint image. The replay virtual viewpoint image is a virtual viewpoint image based on images captured by the image capturing system 101 at an arbitrarily defined time. Note that, unless otherwise stated, description is provided in the following regarding the word "image" to include the concepts of both a moving image (picture) and a still image. That is, the image processing system 10 can process both still and moving images. Furthermore, the image generating server 102 can perform image processing such as the measurement of statistical amounts relating to created images. For example, the image generating server 102 can measure the proportion of the foreground and the background appearing in a virtual viewpoint image.

The information processing apparatus 103 controls the virtual camera, and determines camera parameters indicating the virtual camera viewpoint. The virtual-camera camera parameters include parameters for designating at least one of position, orientation, zoom, and time. The virtual camera position designated by camera parameters indicates a three-dimensional coordinate, for example, and can be indicated by a coordinate in an orthogonal coordinate system having three axes, namely the X, Y, and Z axes. In this case, the position designated by virtual-camera camera parameters indicates a coordinate, and is constituted by, parameters of the three axes X, Y, and Z. Note that the origin of coordinates can be set to an arbitrarily defined position in the image capturing space. The virtual camera orientation designated by camera parameters can be indicated by rotation angles about rotation axes of three axes, namely the pan, tilt, and roll, for example. In this case, the virtual camera orientation designated by camera parameters can be constituted by parameters of the three axes pan, tilt, and roll. The virtual camera zoom designated by camera parameters is indicated by one axis, which is the focal distance, for example. Furthermore, the time is a uniaxial parameter. Accordingly, the virtual-camera camera parameters in the present embodiment at least include parameters of eight axes (three axes for the position, three axes for the orientation, one axis for the focal distance, and one axis for the time). The information processing apparatus 103 can control these eight axes. Note that the camera parameters that the information processing apparatus 103 can control may be configured to include parameters defining other factors and not include all of the above-described parameters of the eight axes.

The information processing apparatus 103 transmits the virtual-camera camera parameters that have been determined to the image generating server 102. The image generating server 102 generates a virtual viewpoint image based on the camera parameters received from the information processing apparatus 103, and transmits the virtual viewpoint image to the information processing apparatus 103. The information processing apparatus 103 displays the virtual viewpoint image received from the image generating server 102 on a camera view window 301 (described later with reference to FIGS. 2 and 3). Note that the live virtual viewpoint image and the replay virtual viewpoint image may be generated using one information processing apparatus 103 as in the present embodiment, or two or more information processing apparatuses 103 may be prepared, and the live virtual viewpoint image and the replay virtual viewpoint image may be generated using different information processing apparatuses 103.

FIG. 1B is a diagram describing a hardware configuration of the information processing apparatus 103, A CPU 111 controls the entire information processing apparatus 103 using computer programs and data stored in a RAM 112 and a ROM 113. The RAM 112 temporarily stores data supplied from the outside via a communication unit 114, such as interim calculation results and computer programs read from the ROM 113. The ROM 113 holds computer programs and data that do not need to be changed. The communication unit 114 includes communication means such as Ethernet and USB, and communicates with the image generating server 102. An input/output unit 115 includes a plurality of controllers for controlling the virtual camera, and a plurality of display units for displaying virtual camera state, etc.

Figure 2:
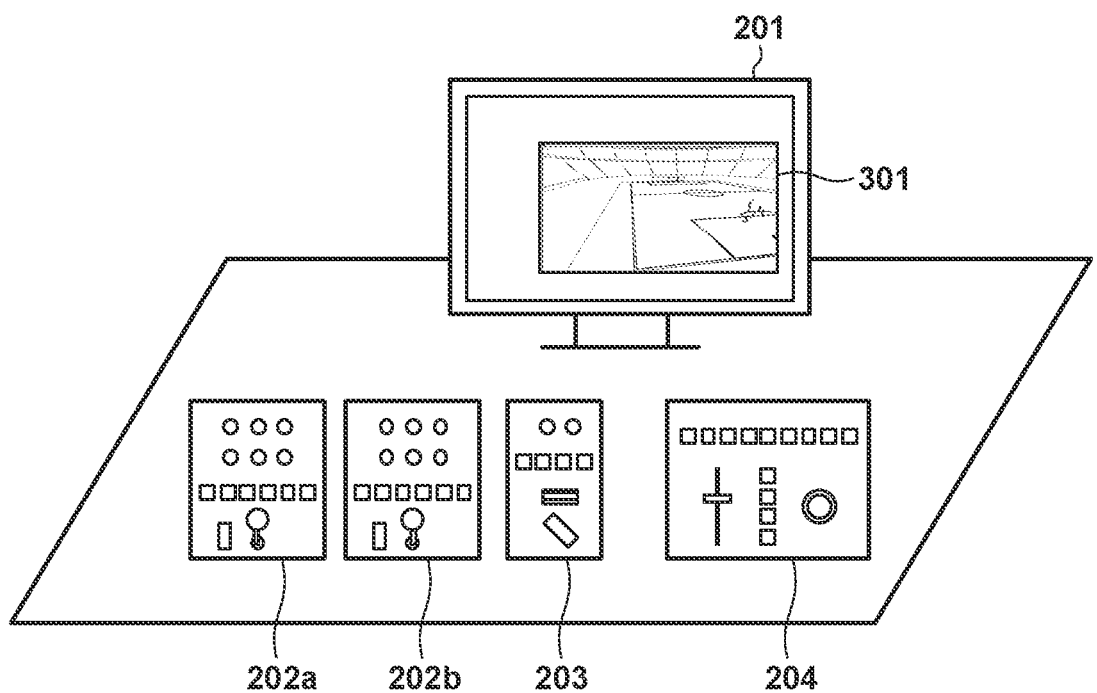
FIG. 2 is a diagram for describing a configuration of an input/output unit in the information processing apparatus.

FIG. 2 is a diagram for describing the input/output unit 115. A display unit 201 displays the camera view window 301. The camera view window 301 is a window for displaying the virtual viewpoint image received from the image generating server 102. Furthermore, the input/output unit 115 includes controllers that serve as acceptance units for accepting instructions based on user operations for controlling the virtual camera. The user can perform operations for changing the position, orientation, etc., of the virtual camera via the controllers. A triaxial controller 202a and a triaxial controller 202b are each a controller with which three axes can be operated. A desired control can be assigned to each axis by performing settings. For example, the triaxial controller 202a controls the three axes X, Y, and Z for designating the virtual camera position. Furthermore, the triaxial controller 202h controls the three axes pan, tilt, and roll for designating the virtual camera orientation, for example.

A zoom controller 203 is a controller that controls the virtual camera zoom. A replay controller 204 is a controller that controls the function for generating the replay virtual viewpoint image. Furthermore, the control of the virtual camera time is also assigned to the replay controller 204. Note that the input/output unit 115 illustrated in FIG. 2 is merely one example, and the input/output unit 115 is not limited to that illustrated in the drawing. For example, the input/output unit 115 may include two or more display units. Furthermore, the number and types of controllers that the input/output unit 115 includes are not limited to those in the configuration illustrated in the drawing.

Figure 3:
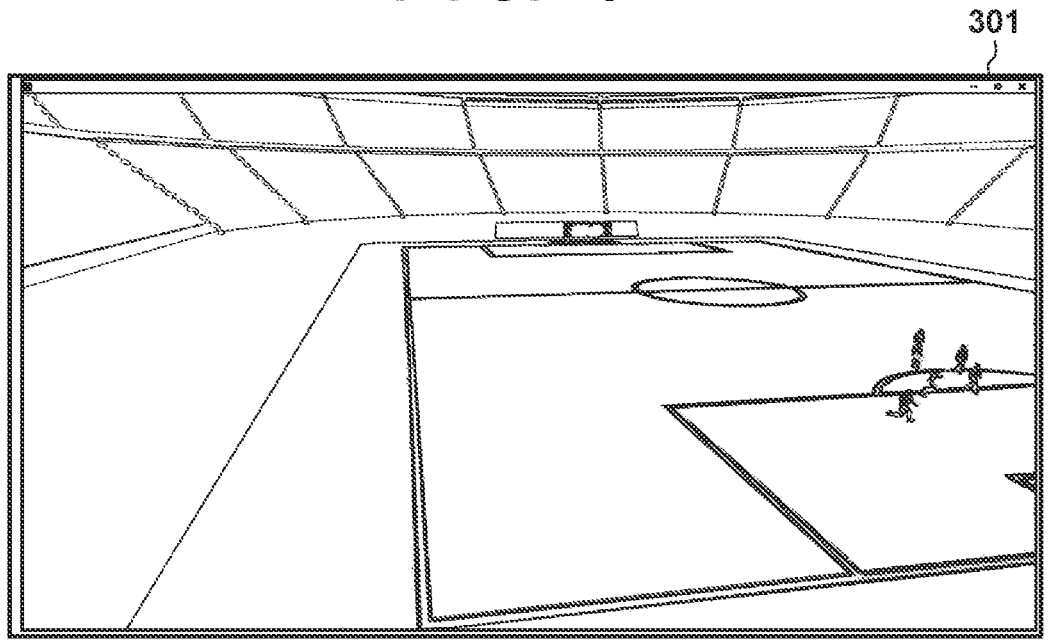
FIG. 3 is a diagram for describing a camera view window.

FIG. 3 is a diagram illustrating one example of the camera view window 301. The camera view window 301 is displayed on the display unit 201, for example. In the present embodiment, it is supposed that a virtual viewpoint image including people playing soccer in a stadium as photographic subjects is generated. The camera view window 301 is a display region displaying the virtual viewpoint image received from the image generating server 102. This virtual viewpoint image is a virtual viewpoint image as seen from the virtual camera controlled by the user. By controlling the virtual camera time, the information processing apparatus 103 can also display past virtual viewpoint images that are recorded. In the present embodiment, unless otherwise stated, the newest virtual viewpoint image that can be created is displayed, and it can be regarded that the image at the current time is displayed in real time if the processing time of the virtual viewpoint image is infinitely close to zero.

Figure 4:
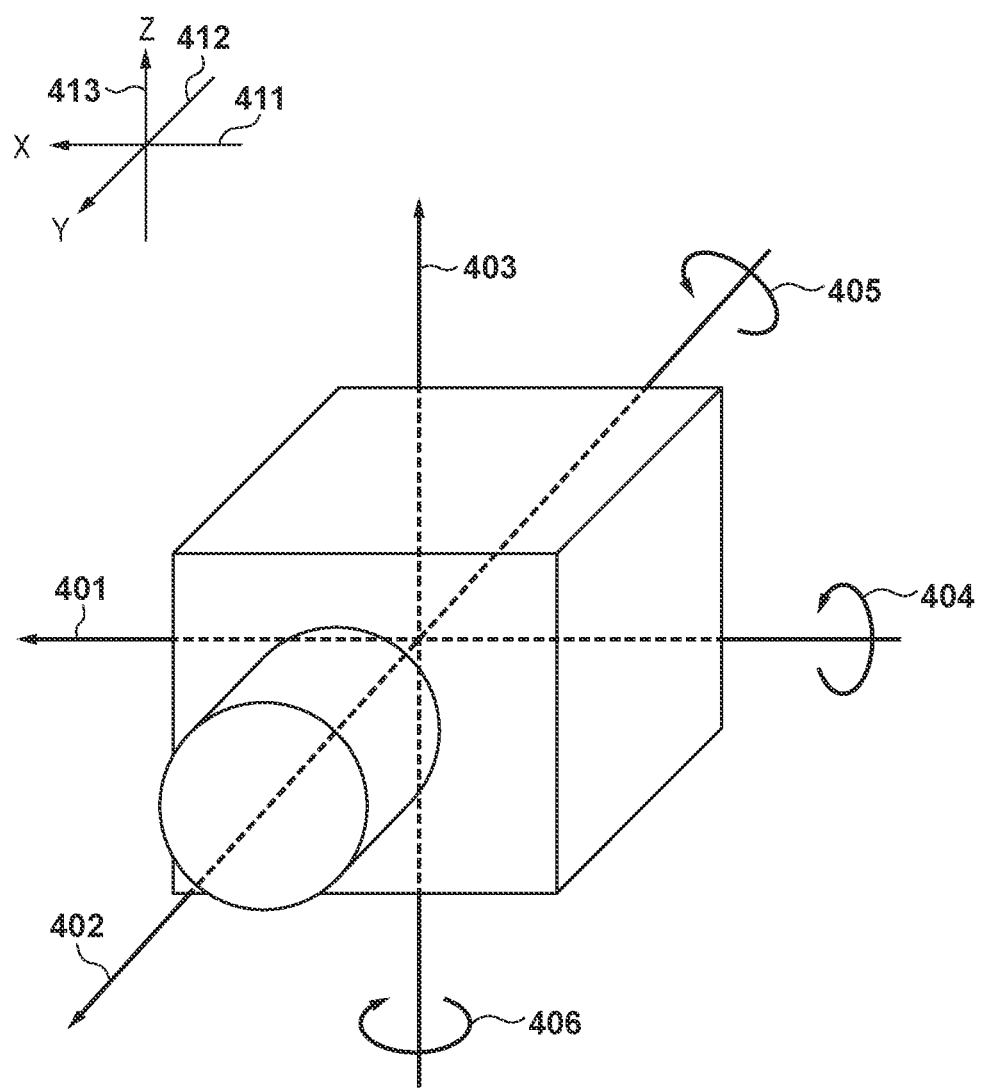
FIG. 4 is a schematic diagram providing illustration regarding a virtual camera and a world-coordinate coordinate system.

FIG. 4 is a schematic diagram providing illustration regarding the virtual camera and a world-coordinate coordinate system. In the present embodiment, an X axis 411 indicates movement on a two-dimensional plane, and is a parameter indicating movement with respect to the long-side direction of a soccer ground (direction that is parallel with the touchlines). Similarly to the X axis 411, a Y axis 412 also indicates movement on a two-dimensional plane, and is a parameter indicating movement with respect to the short-side direction of the soccer around (direction that is parallel with the halfway line). A Z axis 413 is a parameter indicating movement in the height direction, and is a parameter indicating movement in the vertical direction relative to the ground.

Note that the direction of each axis is not limited to this. For example, any of the axes described herein may be replaced with one another. For example, the Y axis 412 may be set as the vertical direction, or the X axis 411 may be set as the vertical direction. In such cases, one of the two remaining axes would be parallel with the long-side direction of the soccer ground, and the other would be parallel with the short-side direction. Furthermore, the positive direction along each axis may be either direction. With regard to the vertical direction, which is the Z axis, the upper direction takes a positive value in the present example. However, a configuration may be adopted such that the upper direction takes a negative value. Furthermore, as long as the X, Y, and Z axes are perpendicular to one another, and an arbitrarily defined point on a space can be indicated using the parameters of the three axes, the directions of the axes may be changed, as appropriate, in accordance with the shapes of the models that are the photographic subjects, etc.

A tilt 404 is a parameter indicating the upward/downward rotation of the optical axis of the virtual camera, and is the rotation of the virtual camera about a tilt axis 401. A roll 405 is a parameter indicating the rotation about the optical axis of the virtual camera, and is the rotation of the virtual camera about a roll axis 402. A pan 406 is a parameter for rotating the optical axis of the virtual camera in the left and right directions, and is the rotation of the virtual camera about a pan axis 403, FIG. 1C is a block diagram illustrating an example of a functional configuration of the information processing apparatus 103, which functions as a virtual camera control apparatus that controls a virtual camera in accordance with a user operation that is an instruction for an operation of the virtual camera for generating a virtual viewpoint image. A parameter generating unit 151 sets initial parameters of the virtual camera, and then, in accordance with user operations, generates parameters for controlling the operations of the virtual camera. Here, the operations of the virtual camera include moving the virtual camera position, moving the virtual camera direction, changing the zoom of the virtual camera, etc. A constraint unit 152 determines whether or not to constrain an operation of the virtual camera that is in accordance with an accepted user operation, based on whether or not a condition set in advance with regard to the virtual camera is fulfilled. For example, in the present embodiment, the constraint unit 152 judges whether or not the post-movement virtual camera position indicated by a user operation is within a moveable range set in advance. Furthermore, the constraint unit 152 constrains the operation of the virtual camera based on the user operation if the post-movement position is judged as being outside the movable range. In the present embodiment, the user operation is invalidated due to this constraint.

A constraint cancel unit 153 cancels the constraint imposed by the constraint unit 152 if a cancellation condition set in advance with regard to the virtual camera is fulfilled after the movement based on the user operation. For example, the constraint cancel unit 153 cancels the constraint imposed on the virtual camera if the above-described condition set in advance with regard to the virtual camera is fulfilled. In the present embodiment, even if the virtual camera moves to the outside of the movable range, the constraint imposed by the constraint unit 152 is cancelled and the movement of the virtual camera based on the user operation is executed provided that the direction of the virtual camera fulfills the cancellation condition. An autopilot navigation execution unit 160 is a configuration that is used in the third embodiment, and can be omitted in the first and second embodiments. A parameter change unit 154 changes the virtual-camera camera parameters in accordance with the navigation of the virtual camera.

Figure 5:
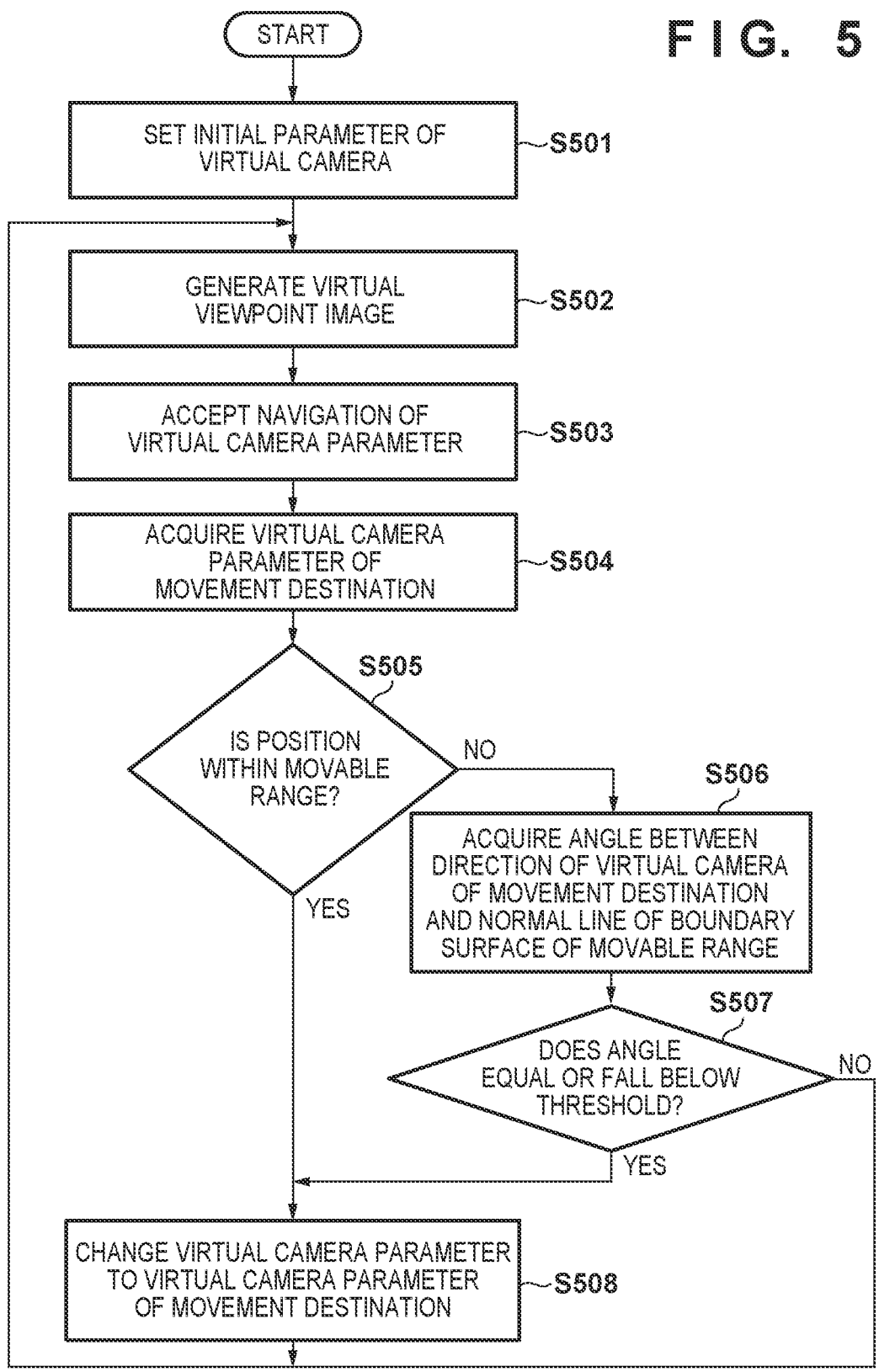
FIG. 5 is a flowchart illustrating processing in the image processing system based on a first embodiment.

Operations of the image processing system 10 and the information processing apparatus 103 in the first embodiment, which have configurations as described above, will be described. FIG. 5 is a flowchart illustrating processing in the image processing system 10 based on the first embodiment.

Figure 6:
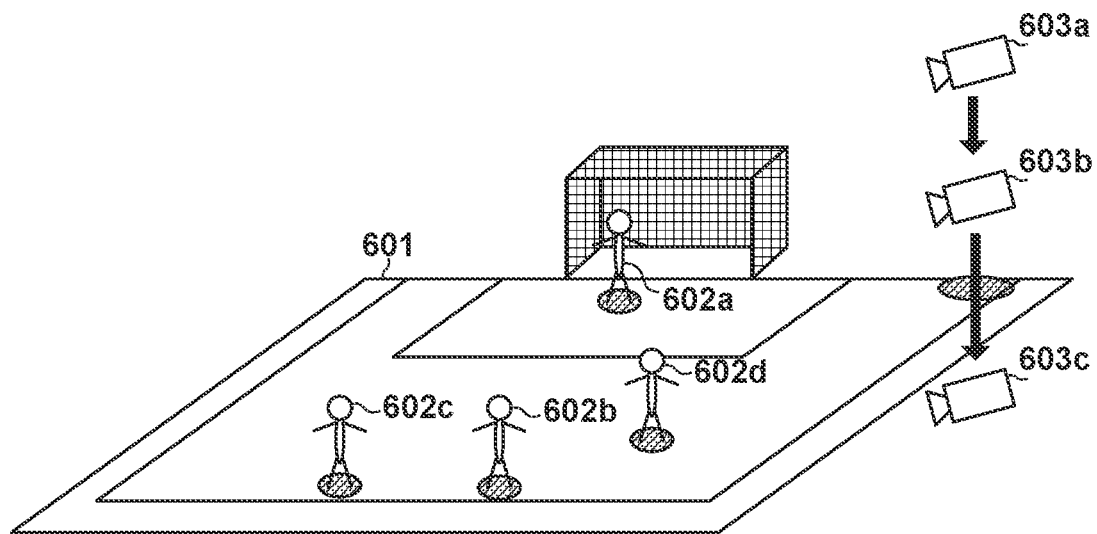
FIG. 6 is a schematic diagram illustrating the state of navigation of the virtual camera and people who are photographic subjects.

The parameter generating unit 151 of the information processing apparatus 103 sets the initial parameters of the virtual camera to the image generating server 102 (step S501). FIG. 6 is a diagram schematically illustrating the state of operation of the virtual camera and people who are photographic subjects. "601" indicates the ground near a penalty area in a soccer stadium, and is the target for which a virtual viewpoint image is generated. "602a", "602b", "602c", and "602d" each indicate a player inside the penalty area. Furthermore, "603a" to "603c" schematically illustrate virtual cameras having positions/orientations set based on parameters. In FIG. 5, it is supposed that the virtual camera 603a is set based on the initial parameters.

Figure 7:
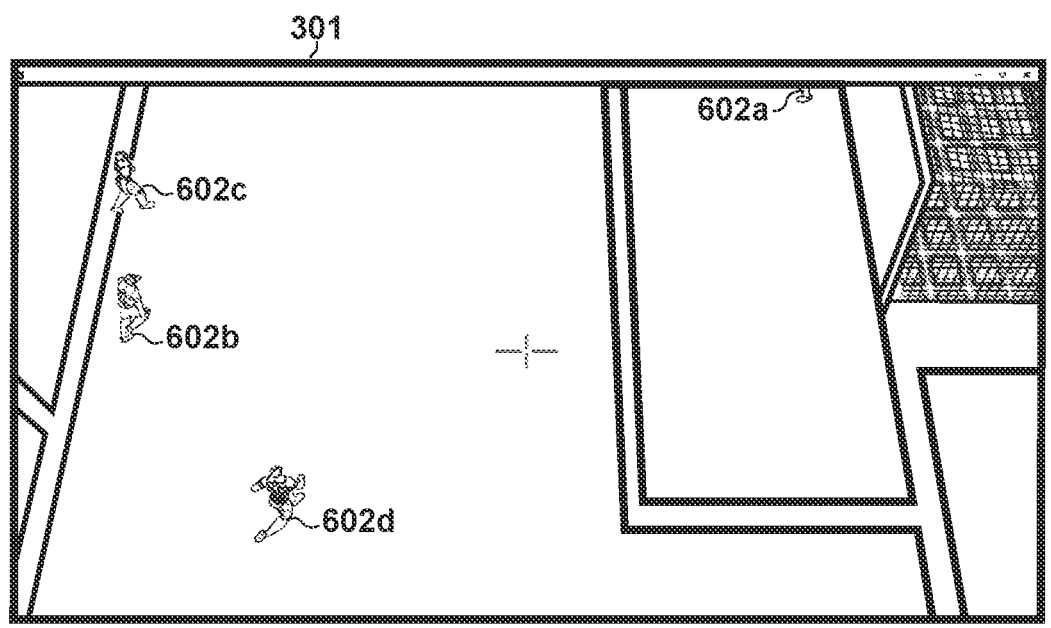
FIG. 7 is a diagram illustrating a virtual viewpoint image based on initial parameters.

The image generating server 102 generates a virtual viewpoint image based on the initial parameters of the virtual camera designated by the information processing apparatus 103 (step S502). Here, a virtual viewpoint image from the virtual camera 603a corresponding to the initial parameters is generated. The information processing apparatus 103 receives the virtual viewpoint image from the image generating server 102, and displays the virtual viewpoint image on the camera view window 301 of the display unit 201 as illustrated in FIG. 7, for example. The virtual viewpoint image illustrated in FIG. 7 is an image captured from the virtual camera 603a, i.e., a virtual viewpoint image generated for the virtual camera 603a, for example.

The user controls the virtual-camera camera parameters by operating the triaxial controllers 202a and 202b, the zoom controller 203, etc., while viewing the virtual viewpoint image displayed on the display unit 201. The parameter generating unit 151 accepts these user operations (step S503), For example, suppose that the user performs an operation of changing the Z axis parameter and moving the virtual camera position in the Z-axis negative direction by operating the triaxial controller 202a. Upon receiving the user operation of the virtual camera, the parameter generating unit 151 generates camera parameters of a movement-destination virtual camera that are in accordance with the details of the instruction (step S504). For example, due to the operation toward the Z-axis negative direction, camera parameters indicating a virtual camera 603b are generated as camera parameters of the movement-destination virtual camera based on the user operation.

The constraint unit 152 of the information processing apparatus 103 judges whether or not the position of the virtual camera 603b indicated by the parameters generated in step S504 is within a movable range of the virtual camera (step S505). In the first embodiment, it is supposed that a setting region defined as extending from the ground surface to the topmost portion of the stadium as illustrated in FIG. 3 in the Z axis direction, and extending to the positions of the spectator seats in the X and Y axis directions is used as the movable range. The definition of the setting region serving as the movable range is of course not limited to this. It suffices for the setting region to be a region in a three-dimensional space in which a three-dimensional model of an object is present. For example, if a model of not only a stadium but also a wider area can be prepared, a wide range extending to the outside of the stadium may be defined. Furthermore, if the area for which a virtual viewpoint image can be created is limited due to processing capability, image capturing conditions, etc., the movable range may be set as a small range such as the inside of the field of the ground or the inside of the penalty area in the case of soccer, for example. Furthermore, it suffices for a region in which a three-dimensional model is present to be a region in which at least one of a three-dimensional model of a foreground object, a three-dimensional model of a background object, and a three-dimensional model of a virtual object is present. For example, a region in a three-dimensional virtual space in which at least one of a foreground object corresponding to a player, etc., a background object corresponding to a stadium, etc., and a virtual object that is not present in the real space is present may be set as the movable range. Furthermore, a region included in at least one of the plurality of captured images acquired by the plurality of cameras included in the image capturing system 101 may be set as the movable range.

If the movement destination of the virtual camera is within the movable range (YES in step S505), the constraint unit 152 does not constrain the user operation. Consequently, the parameter change unit 154 changes the virtual-camera camera parameters to the camera parameters generated by the parameter generating unit 151 in step S504 (step S508). For example, if the movement destination is the virtual camera 603b, the parameter change unit 154 changes the virtual camera parameters to the parameters acquired by the parameter generating unit 151 in step S504 since the movement destination is within the movable range. Following this, a virtual viewpoint image based on the virtual camera 603b is generated.

On the other hand, if the position of the movement-destination virtual camera is not within the movable range (NO in step S505), processing moves on to step S506, For example, if the movement destination is a virtual camera 603c, the Z-axis direction value of the position is below the ground surface, i.e., a negative value. In this case, processing moves on to step S506 because the position of the movement-destination virtual camera is not within the movable range. The constraint unit 152 executes the constraint by invalidating the user operation if there is no instruction to cancel the constraint from the constraint cancel unit 153. If an instruction to cancel the constraint is provided by the constraint cancel unit 153, the movement of the virtual camera in accordance with the user operation is executed. In the present embodiment, the constraint is cancelled if the virtual camera direction after the movement based on the user operation, relative to a boundary surface defining the movable range, is within a predetermined angular range, which is the cancellation condition. In the following, steps S506 and S507 are one example of constraining and constraint cancellation operations by the constraint unit 152 and the constraint cancel unit 153.

If it is judged that the virtual camera movement destination is outside the movable range, the constraint cancel unit 153 calculates the angle between a normal line of the boundary surface of the movable range and a vector of camera parameters of the movement-destination virtual camera (step S506). The boundary surface of the movable range is present between the virtual camera position indicated by the current camera parameters and the virtual camera position indicated by the camera parameters after being changed based on the user operation. A normal line direction of the boundary surface is adopted as a normal line vector serving as a reference. Note that, in the present embodiment, the inside of the movable range, i.e., the side in which the virtual camera can be moved, is regarded as the front side of the boundary surface, and it is supposed that the normal line vector of the boundary surface faces the inside of the movable range. However, the normal line direction is not limited to this. For example, a normal line facing the opposite direction (a normal line vector facing the outside of the movable range) may be used. In such a case, vector calculation, etc., are to be modified as appropriate so that the results of the judgment regarding the constraint cancellation condition are equal to those described in the present embodiment. Furthermore, a vector indicating a line-of-sight direction corresponding to the virtual camera direction (referred to in the following as "direction vector") is determined by parameters indicating the three aspects of the pan, tilt, and roll of the virtual camera, which are defined by camera parameters. The angle between these two vectors is determined through calculation.

Figure 8:
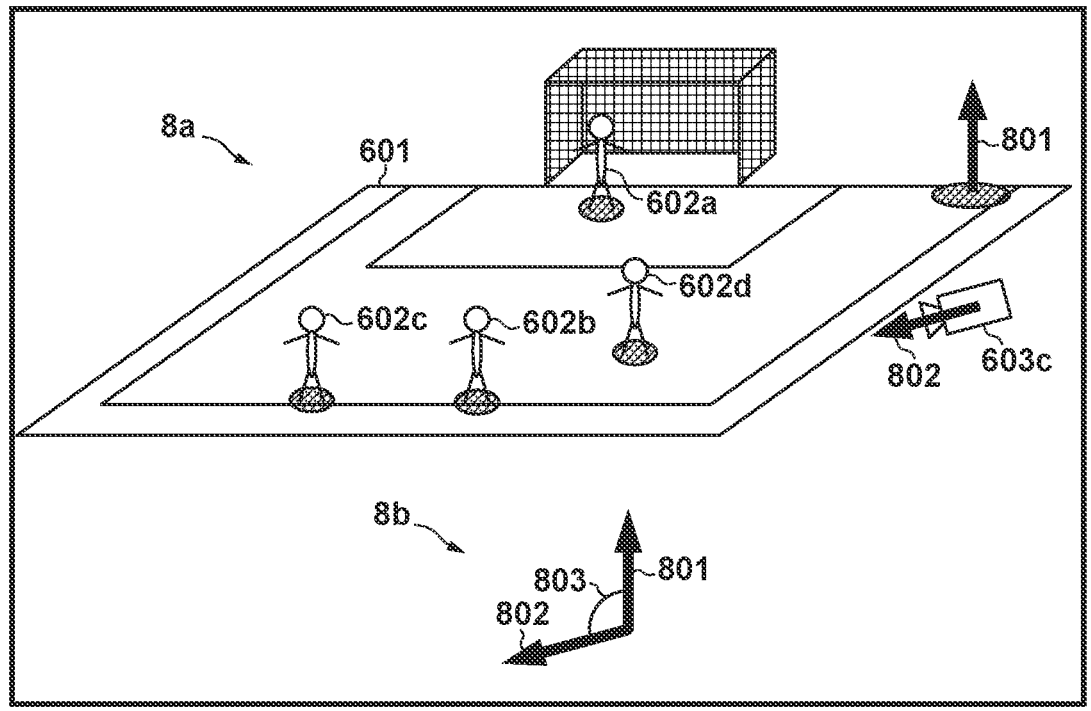

In FIG. 8, 8a is a schematic diagram illustrating a direction vector 802 of the virtual camera, which can be obtained from the camera parameters of the movement-destination virtual camera, and a normal line vector 801 of the boundary surface of the movable range. The normal line vector 801 is a vector indicating a normal line of the boundary surface of the movable range, and it is supposed that the ground is equivalent to the boundary surface in the present example. The direction vector 802 is a vector indicating the virtual camera direction set in the camera parameters of the movement-destination virtual camera. Schematic diagram 8b in FIG. 8 is a schematic diagram illustrating the angle formed by the normal line vector 801 and the direction vector 802 illustrated in schematic diagram 8a. Suppose that an angle 803 is obtained by measuring the angle between the normal line vector 801 and the direction vector 802. Here, suppose that the angle 803 is an obtuse angle having an angle greater than 90 degrees.

The constraint cancel unit 153 outputs a cancellation instruction to cancel the constraint imposed by the constraint unit 152 if the angle formed by the normal line vector and the direction vector is within a predetermined angular range. In the present embodiment, the constraint cancel unit 153 judges that the cancellation condition is fulfilled and outputs a cancellation instruction if the angle formed by the normal line vector and the direction vector is equal to or less than a threshold (for example, equal to or less than 90 degrees). In a case in which the boundary surface of the movable range is a horizontal plane and the normal line vector is oriented vertically upward as in the example in FIG. 8, the condition that the angle formed by the normal line vector and the direction vector is equal to or less than the threshold is equivalent to a condition that the elevation angle of the virtual camera direction is greater than or equal to a predetermined value. Specifically, in FIG. 5, processing moves on to step S508 if the angle between the two vectors calculated in step S506 equals or falls below the threshold (YES in step S507), and otherwise (NO in step S507), processing returns to step S502. Here, supposing that the threshold is 90 degrees, processing returns to step S502 in the example illustrated in schematic diagram 8b in FIG. 8 due to having an angle greater than 90 degrees. That is, the constraint cancel unit 153 does not output a cancellation instruction, and the constraint unit 152 invalidates the user operation Specifically, the constraint unit 152 discards the camera parameters of the movement-destination virtual camera, and the change of parameters by the parameter change unit 154 is not performed. Consequently, the image capturing by the virtual camera 603a is continued. Thus, the movement of the virtual camera is constrained to within the movable range, and a situation in which the user loses track of the virtual camera position and orientation is avoided. Note that while the threshold is 90 degrees in the present example, the present example is not limited to this.

Figure 9:
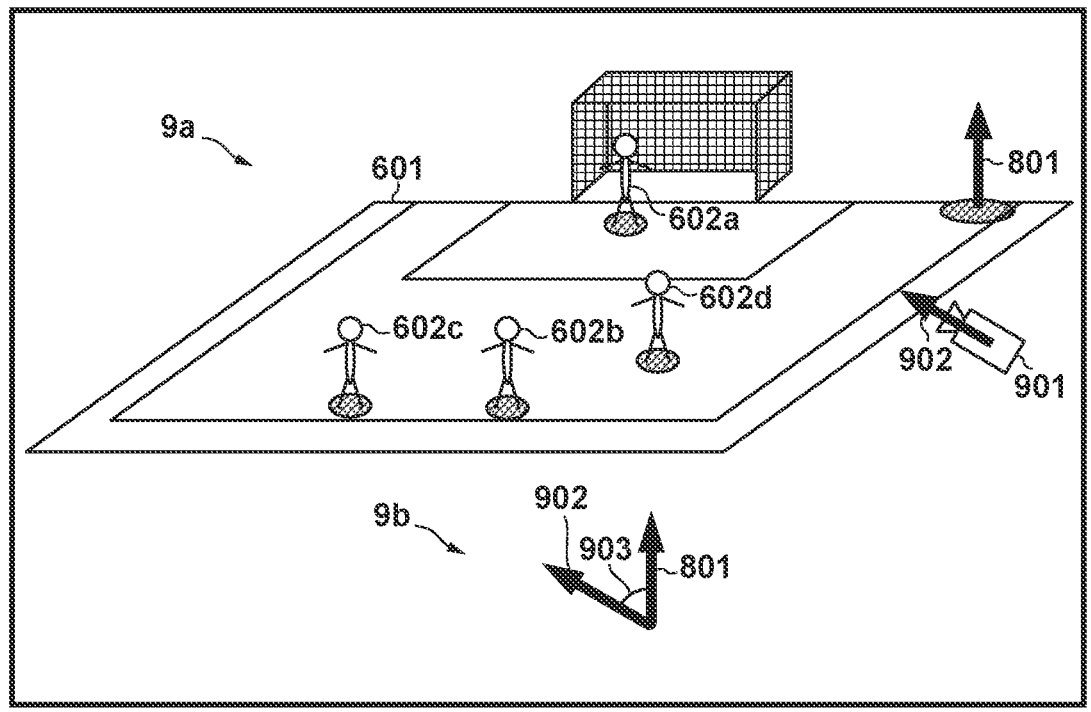

In the above, a case in which an operation for only the movement in the Z axis direction is performed with regard to the virtual camera has been described. In the following, a case in which an operation for tilting the camera was performed concurrently with the operation regarding the Z axis, and thus an operation for changing the camera direction upward was also performed will be described. Schematic diagram 9a in FIG. 9 is a schematic diagram illustrating the situation in this case. A movement-destination virtual camera 901 designated by the user operations has the same three-dimensional position (the values of the parameters of the X, Y, and Z axes are the same) as the virtual camera 603c, but the direction of the virtual camera 901 (direction vector 902) differs from that of the virtual camera 603c.

Schematic diagram 9b in FIG. 9 is a schematic diagram illustrating the angle formed by the normal line vector 801 and the direction vector 902 illustrated in schematic diagram 9a. An angle 903 is obtained if the angle between the direction vector 902 and the normal line vector 801 is measured in a similar manner as in schematic diagram 8b in FIG. 8. Suppose that the angle 903 is an angle equal to or less than 90 degrees (an acute angle). In this case, the constraint cancel unit 153 judges that the cancellation condition (condition that the angle is equal to or less than the threshold) is fulfilled, and provides the constraint unit 152 with a cancellation instruction to cancel the constraint imposed by the constraint unit 152. Consequently, processing moves on to step S508 from step S507, and the parameter change unit 154 changes the virtual-camera camera parameters to the movement-destination camera parameters based on the user operation acquired in step S504. Thus, in accordance with user operations, the virtual camera can move within the movable range (for example, virtual camera 603b), and can also move to the outside of the movable range if the constraint cancellation condition is fulfilled (virtual camera 901).

Note that the condition that the angle between the normal line vector of the boundary surface and the direction vector of the virtual camera is equal to or less than the predetermined threshold is adopted as the cancellation condition in the above-described example. In other words, the threshold is fixed. However, even if the virtual camera direction is the same, the more the virtual camera is moved to the Z-axis negative direction, the greater the shift of the image capturing position of the virtual camera in the field plane. Thus, a configuration may be adopted such that the predetermined threshold indicating the upper limit of the angle between the normal line vector decreases as the value in the Z-axis negative direction increases.

Figure 10A:
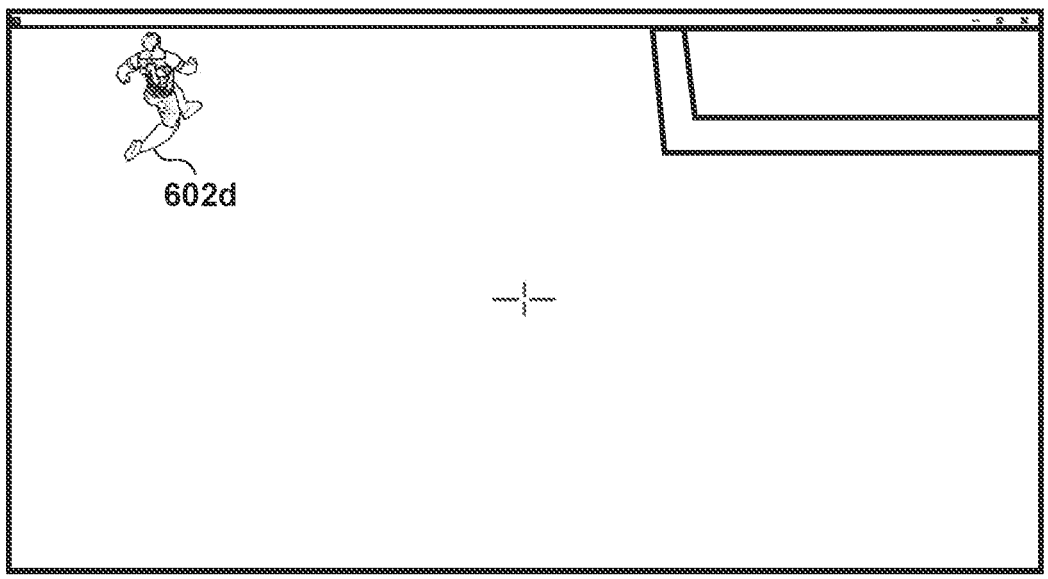
FIG. 10A is a diagram indicating a virtual viewpoint image based on a virtual camera 603b.
Figure 10B:
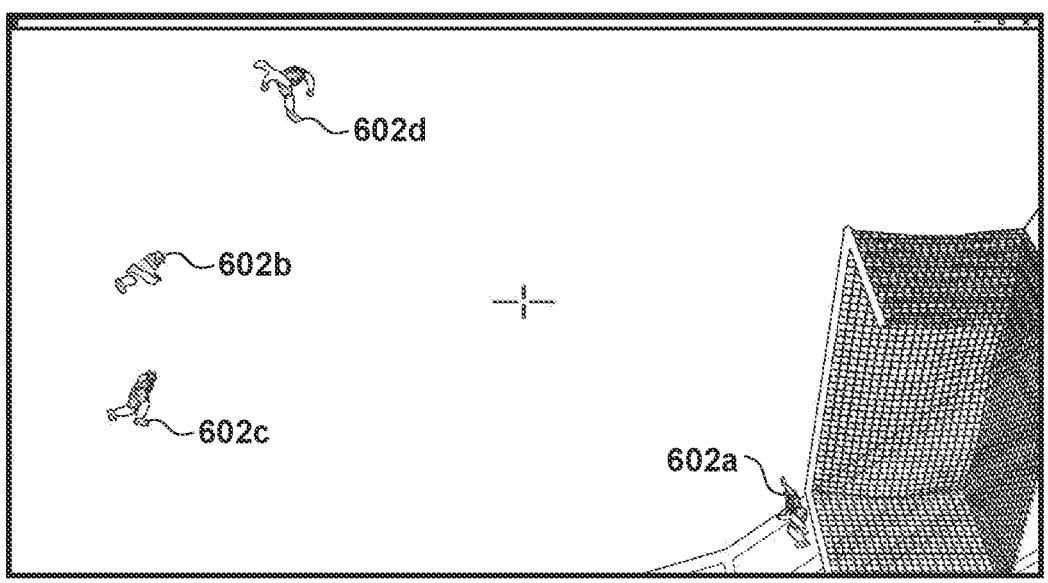
FIG. 10B is a diagram indicating a virtual viewpoint image based on a virtual camera 901.

After the processing in step S508, a virtual viewpoint image is generated in step S502 using the changed virtual-camera camera parameters. FIGS. 10A and 10B illustrate virtual viewpoint images in the present processing. FIG. 10A is the virtual viewpoint image obtained from the virtual camera 603b, and it can be seen that the Z-axis direction value is smaller than that of the virtual camera 603a (the height from the ground is lower), and the distance to the player 602d has decreased. Furthermore, FIG. 10B is the virtual viewpoint image obtained from the virtual camera 901, which is an image showing a state when looking up from under the ground. In this example, settings are adopted such that the rear side of the ground surface (in a case when looking up toward the positive number side from the negative number side along the Z axis) is invisible, and a virtual viewpoint image providing an impression of looking up at players from below the ground can be created.

As described above, according to the first embodiment, the virtual camera can be navigated to the outside of the movable range without losing track of the virtual camera position and orientation. For example, if the elevation angle of the direction of the virtual viewpoint is less than the predetermined value, the information processing apparatus 103 controls the movement of the virtual viewpoint so that the virtual viewpoint does not move into an underground region in accordance with an input for moving the virtual viewpoint vertically downward. Thus, the generation of a virtual viewpoint image from which the virtual viewpoint position and direction are difficult to specify, such as a virtual viewpoint image in which the field of view of the virtual viewpoint is dominated by the underground region, can be suppressed.

In addition, the angle between the direction vector of the movement-destination virtual camera and the normal line vector of the boundary surface of the movable range is used as the cancellation condition for canceling the constraint so that movement from the inside of the movable range to the outside (movement from the inside to the outside of the setting region) is possible in the first embodiment. However, the present invention is not limited to this. For example, the condition that the angle between the normal line vector of the boundary surface of the movable range and a direction vector of the current virtual camera before the movement based on the user operation, rather than that of the movement-destination virtual camera, is within a predetermined angular range may be adopted as the cancellation condition.

Thus, it can be ensured that a user operation is not subject to the constraint imposed by the constraint unit 152 if the virtual camera is in a predetermined positional range, for example.

Furthermore, a configuration may be adopted such that an input member for accepting a user instruction for cancelling the constraint is prepared, and the constraint cancel unit 153 cancels the constraint imposed by the constraint unit 152 when the user operates the input member. Such an input member may be provided on a controller such as the triaxial controllers 202a and 202b, the zoom controller 203, or the replay controller 204, for example. Furthermore, such an input member may be provided on a controller differing from the above-described controllers. In addition, such a different controller may be configured so as to be operated using a foot rather than a hand. Also, the controllers may be present as GUIs displayed on the display unit 201, and the GUIs may be operated via a touch panel, a mouse, etc. Furthermore, the above-described input member may have any shape or input method, and may be an input member having any shape, such as a button, a switch, a slider, a lever, a touch sensor, a knob, a pedal, or a rocker switch.

Furthermore, a configuration may be adopted such that it is judged that the cancellation condition is fulfilled if the current virtual camera position is near the boundary of the movable range and a user operation toward the outside of the movable range is continued for a predetermined amount of time or more. This is since it can be considered that the user has a firm intension of moving the virtual camera to the outside of the movable range while recognizing that the virtual camera will move to the outside of the prescribed movable range. In other words, the information processing apparatus 103 may perform a control for delaying the start of the movement of the virtual camera to the outside of the movable range.

Furthermore, a configuration may be adopted such that the constraint cancel unit 153 judges that the cancellation condition is fulfilled if a method of specifically setting the camera parameters from the outside, as in the case of the initial camera parameters, is used. For example, a configuration may be adopted such that the constraint on user operations is cancelled if the virtual camera position is input from a file, etc., or input directly as numerical values using input from a keyboard, etc. Furthermore, while the operation of the virtual camera is constrained by the constraint unit 152 not accepting user operations (by invalidating user operations) in the above, the present invention is not limited to this. For example, the constraint unit 152 may slow down the operation of the virtual camera operated by the user. Due to the moving speed of the virtual camera being reduced, the user can recognize that he/she is trying to move the virtual camera to the outside of the movable range.

As described above, according to the first embodiment, the constraint on the movement of the virtual camera is cancelled in a situation such that the user would not lose track of the virtual camera position and orientation. Thus, a virtual viewpoint image based on a more intriguing camera path with an expanded virtual camera movable range can be generated.

Second Embodiment

In the first embodiment, the judgment of whether or not the cancellation condition is fulfilled is made using the angle between the normal line vector of the boundary surface and the direction vector of the post-movement virtual camera. In the second embodiment, the judgment of whether or not the cancellation condition is fulfilled is made based on the state of the virtual viewpoint image (for example, a photographic subject drawing ratio) acquired based on the post-movement virtual camera. The second embodiment will be described in the following. Note that the configurations of the image processing system 10 and the information processing apparatus 103 based on the second embodiment are similar to those based on the first embodiment (FIGS. 1A, 1B, and 1C).

FIG. 11 is a flowchart illustrating operations of the image processing system 10 based on the second embodiment. Note that, in FIG. 11, the processing in each of steps S501 to S505 and step S508 is similar to the processing with the same number in the first embodiment (FIG. 5). By executing steps S1101 and S1102, the constraint cancel unit 153 determines whether or not the cancellation condition is fulfilled, and determines whether or not to cancel the constraint imposed by the constraint unit 152.

If the virtual camera movement destination designated by the user operation is outside the movable range (NO in step S505), processing moves on to step S1101. In step S1101, the constraint cancel unit 153 provides the virtual-camera camera parameters to the image generating server 102. The image generating server 102 generates a virtual viewpoint image based on the provided camera parameters. The image generating server 102 calculates a drawing ratio indicating the proportion of the generated virtual viewpoint image occupied by drawing regions of foreground and background models that are photographic subjects. Here, the image generating server 102 may actually create a virtual viewpoint image to acquire the drawing ratio, or may perform only the calculation for determining the drawing ratio without creating a virtual viewpoint image. Furthermore, the proportion of the field of view of the virtual viewpoint occupied by the setting region corresponding to the movable range may be acquired as the drawing ratio. In addition, in a case in which the image generating server 102 actually creates a virtual viewpoint image, the image generating server 102 may generate the virtual viewpoint image while skipping some processing, e.g., while reducing the resolution and/or not performing color processing. The image generating server 102 transmits the acquired drawing ratio to the information processing apparatus 103.

The constraint cancel unit 153 of the information processing apparatus 103 judges whether the drawing ratio received from the image generating server 102 is greater than or equal to a threshold (step S1102). The constraint cancel unit 153 cancels the constraint imposed by the constraint unit 152 (advances processing to step S508) if the photographic subject drawing ratio in the virtual viewpoint image is greater than or equal to the threshold (YES in step S1102), and maintains the constraint imposed by the constraint unit 152 (advances processing to step S502) if the drawing ratio is less than the threshold (NO in step S1102).

For example, if the current virtual camera is the virtual camera 901 and the direction of the virtual camera is the direction vector 902 in FIG. 9, a virtual viewpoint image is generated as illustrated in FIG. 10B. In this case, photographic subjects (players 602a to 602d) constituting the foreground and the goal, etc., constituting the background are shown in the virtual viewpoint image, and the drawing ratio is greater than the threshold. Suppose that the virtual camera orientation is changed from this state by operating the triaxial controllers 202a and 202b, etc.

Figure 12A:
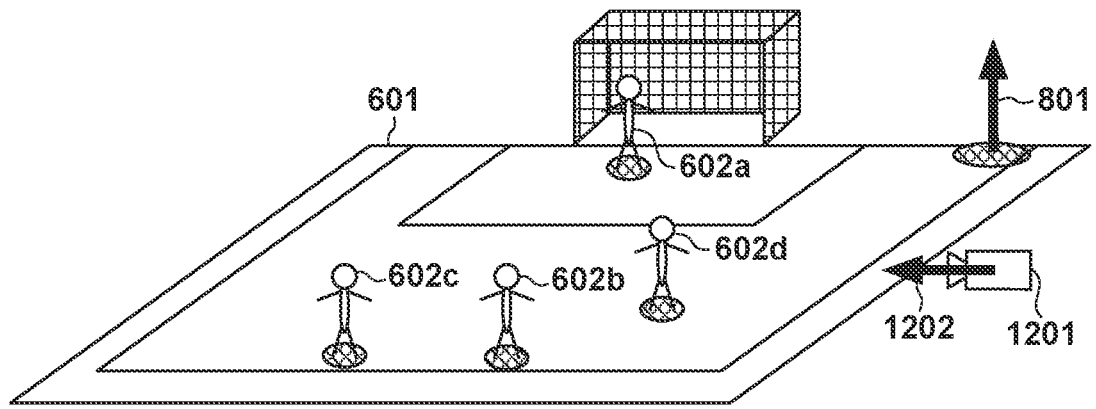
FIG. 12A is a diagram schematically illustrating a change in the orientation of the virtual camera.
Figure 12B:
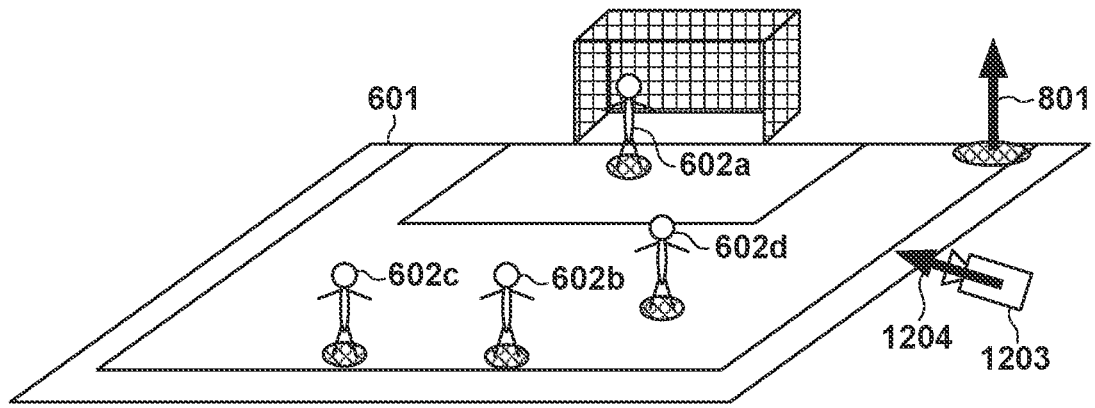
FIG. 12B is a diagram schematically illustrating a change in the orientation of the virtual camera.
Figure 13A:
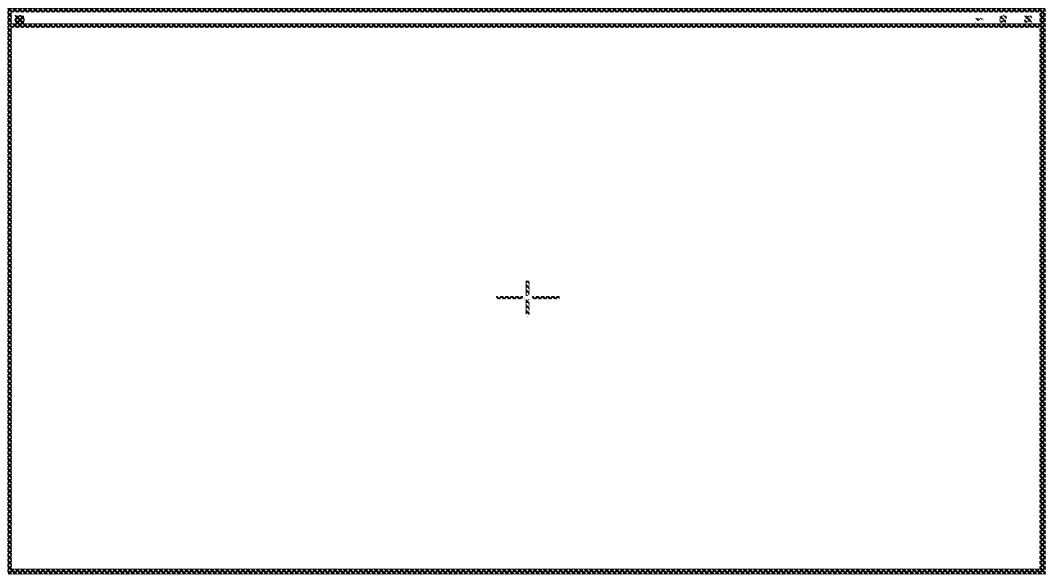
FIG. 13A is a diagram indicating a virtual viewpoint image based on a virtual camera 1201.

FIGS. 12A and 12B are diagrams schematically illustrating the change in the virtual camera orientation in this case. Suppose that a change to a virtual camera 1201 in FIG. 12A is attempted by a user operation. The virtual camera 1201 and the virtual camera 901 have the same positions but have different orientations. That is, a direction vector 1202 of the virtual camera 1201 differs from the direction vector 902. If a virtual viewpoint image from the virtual camera 1201 is generated in this state, the virtual viewpoint image would be as illustrated in FIG. 13A, and photographic subjects would disappear from the screen. Accordingly, the photographic subject drawing ratio would be less than the threshold in step S1102, and the constraint imposed by the constraint unit 152 would be maintained. That is, the change in virtual camera parameters based on the user operation is not reflected, and processing returns to step S502. The user operation is thus invalidated.

Figure 13B:
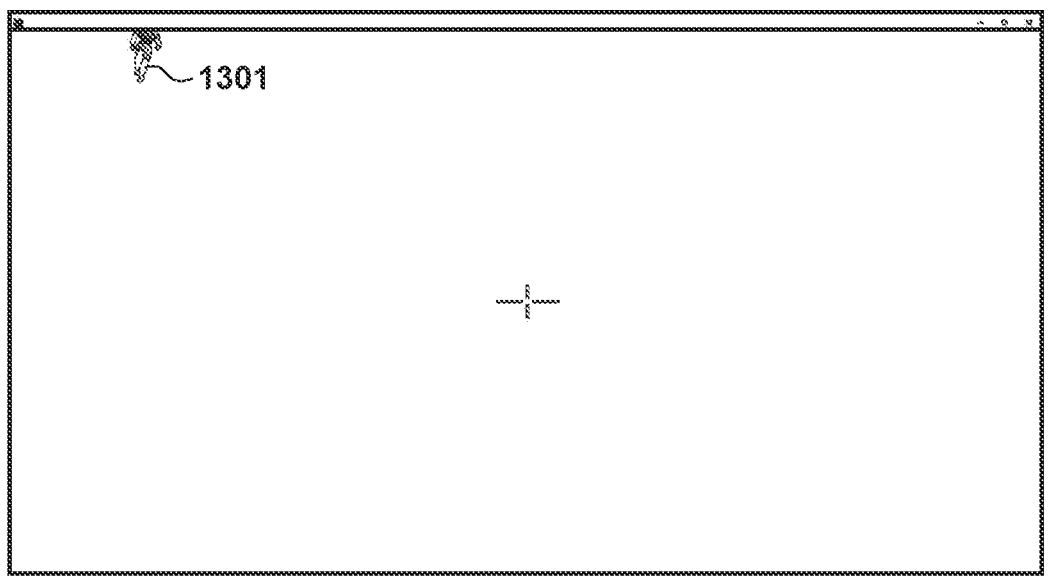
FIG. 13B is a diagram indicating a virtual viewpoint image based on a virtual camera 1203.

Furthermore, suppose for example that the user operates the tri axial controllers 202a and 202b and changes the orientation of the virtual camera from the state in FIG. 9 while maintaining the position of the virtual camera so that the virtual camera direction vector gradually approaches the direction vector 1202. In this case, the photographic subject drawing ratio in the virtual viewpoint image gradually decreases. In this process, a virtual camera 1203 as illustrated in FIG. 121 is set, for example. The position of the virtual camera 1203 is the same as that of the virtual camera 901, and the direction of the virtual camera 1203 is oriented further upward than the direction vector 1202 is (direction vector 1204). If the virtual camera 1203 is set, a virtual viewpoint image as illustrated in FIG. 13B is generated, for example. In FIG. 13B, a person 1301 slightly appears at the edge of the screen. If for example supposing that the photographic subject drawing ratio in this state is equal to the threshold, the cancellation of the constraint imposed by the constraint cancel unit 153 is not performed for the user operation following this point for making the orientation closer to the direction vector 1202. Accordingly, even if the user operates the controllers, no further operations are accepted and the state of the virtual camera 1203 would be maintained.

Note that, while foreground objects, such as players, specific background objects, such as the stadium and the goal, etc., are mentioned as photographic subjects for calculating the drawing ratio in the above, the photographic subjects for calculating the drawing ratio are not limited to these. For example, virtual objects that are not present in reality may be added to the photographic subjects for calculating the drawing ratio. For example, in a case in which virtual advertisement signs, etc., are prepared, these advertisements may be regarded as being photographic subjects. Furthermore, such virtual objects may be located on the ground, inside the stadium, or at other positions, or may be present at locations where the objects cannot be present in reality, such as under the ground of the stadium or in the air. In addition, these virtual objects may be still or may move within specific ranges.

As described above, according to the second embodiment, the degree of freedom with which the virtual camera can be navigated can be expanded while preventing a situation in which the user loses track of the virtual camera position and orientation due to a decrease in the photographic subject drawing ratio in a virtual viewpoint image.

Third Embodiment

In the first and second embodiments, the state in which a user operation is constrained by the constraint unit 152 is maintained if it is judged that the cancellation condition would not be fulfilled after the virtual camera is operated based on the user operation. In the third embodiment, the virtual camera moves automatically in accordance with a predetermined rule if an autopilot navigation condition set in advance is fulfilled in a case in which it is judged that the cancellation condition is not fulfilled.

Figure 14:
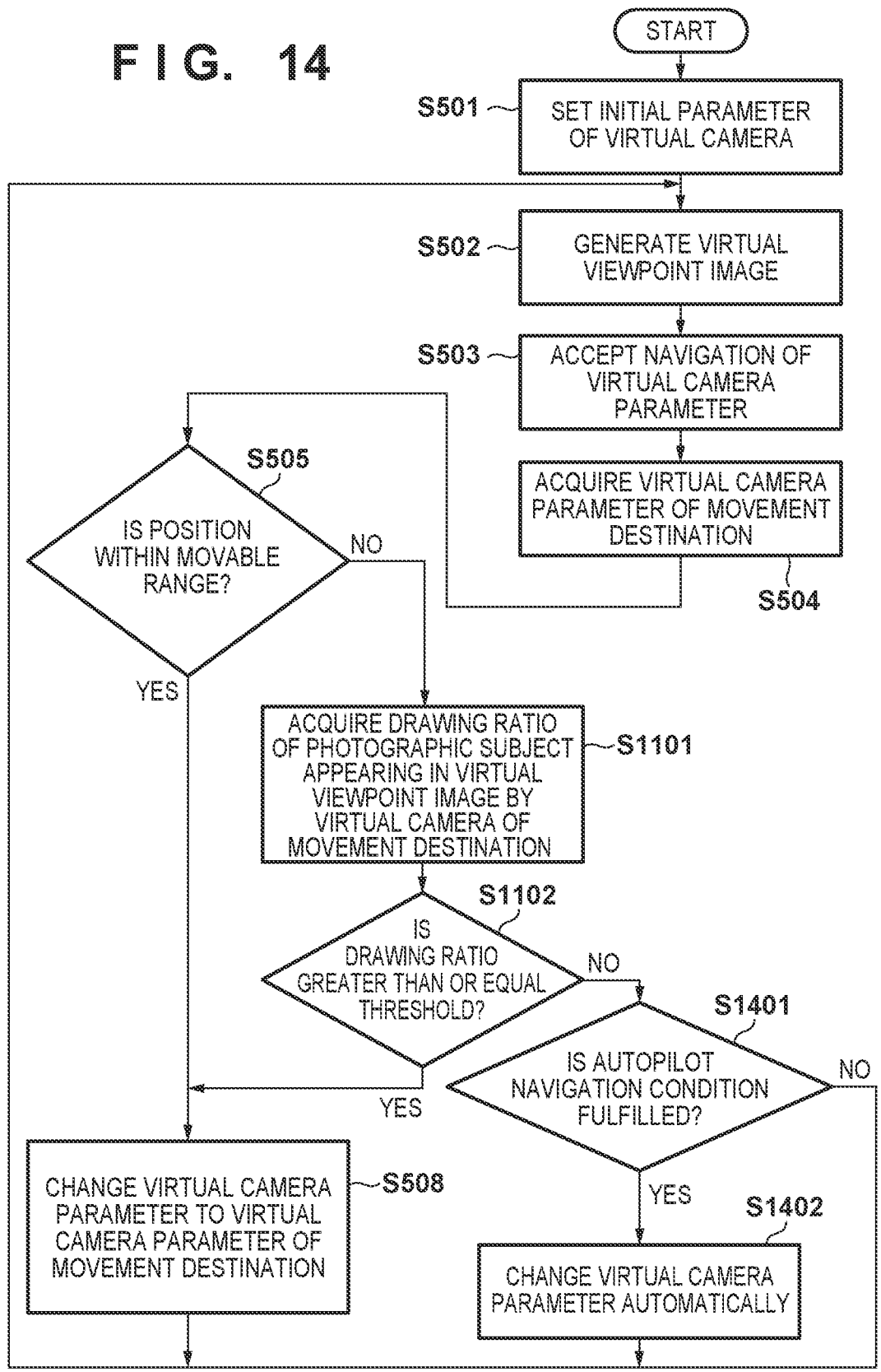
FIG. 14 is a flowchart illustrating processing in the image processing system based on a third embodiment.

FIG. 14 is a flowchart illustrating processing in the image processing system 10 based on the third embodiment. Note that, in FIG. 14, the processing in each of steps S501 to S505, step S508, and steps S1101 and S1102 is similar to the processing with the same number in FIG. 11. In FIG. 1C, the information processing apparatus 103 includes the autopilot navigation execution unit 160. Processing is advanced to step S1401 if the constraint cancel unit 153 determines that the photographic subject drawing ratio in the virtual viewpoint image from the virtual camera is less than the threshold (NO in step S1102). In step S1401, the autopilot navigation execution unit 160 judges whether an autopilot navigation condition is fulfilled, Processing moves on to step S1402 if it is judged that the autopilot navigation condition is fulfilled, and otherwise returns to step S502.

For example, the following cases can be mentioned as cases in which the navigation condition is fulfilled.

(a) Autopilot navigation is set to be valid by an operation on the triaxial controller 202a or 202h.

(b) The result of the determination in step S1102 was consecutively NO for a predetermined number of times within a predetermined period of time.

In step S1402, the autopilot navigation execution unit 160 changes the virtual camera parameters to values obtained by calculation, and executes autopilot navigation of the virtual camera. For example, the camera parameters such as those below can be mentioned as virtual-camera camera parameters (processing for moving the virtual camera) that are changed by the autopilot navigation.

Operation for causing the virtual camera position to return to the inside of the movable range.

Operation for moving the virtual camera orientation so as to face the direction of the center of the ground, the origin of world coordinates, or a point set in advance, for example.

Note that, in the above, a configuration is adopted in which the autopilot navigation execution unit 160 operates if a user operation for moving the virtual camera to the outside of the movable range is accepted. However, the autopilot navigation is not limited to being applied in such a case. For example, if a virtual viewpoint image as illustrated in FIG. 13B is being acquired by the virtual camera 901 (FIG. 9) described in the second embodiment, the occurrence of a situation such that the person 1301 moves outside the screen can be expected. A configuration may be adopted such that the autopilot navigation execution unit 160 executes the autopilot navigation in such a case in which the cancellation condition ends up being unfulfilled without a user operation being involved.

In this case, at a predetermined cycle, the autopilot navigation execution unit 160 analyzes the virtual viewpoint image obtained from the current virtual camera, acquires the photographic subject drawing ratio, and executes steps S1102, S1401, and S1402. A configuration in which the autopilot navigation execution unit 160 does not perform the actual calculation and acquires the drawing ratio from the image generating server 102 may be adopted. By executing steps S1102, S1401, and S1402 using the acquired drawing ratio, the autopilot navigation execution unit 160 executes the autopilot navigation if the autopilot navigation condition is fulfilled.

For example, the following conditions can be mentioned as the autopilot navigation condition in step S1401.

(a) The user has operated an autopilot navigation button on the triaxial controller 202a or 202b.

(b) The lack of input of operations from the user for over a predetermined amount of time.

(c) The result of the determination in step S1102 was consecutively NO for a predetermined number of times within a predetermined period of time.

(d) The continuation for a predetermined amount of time of a state in which the photographic subject drawing ratio is less than the threshold.

For example, suppose that, due to photographic subjects disappearing from the virtual viewpoint image, the user operates the autopilot navigation button judging that he/she has lost track of the virtual camera position and orientation. In this case, the autopilot navigation condition (a) is fulfilled, and processing moves on to step S1402 from step S1401. Consequently, the autopilot navigation execution unit 160 executes the autopilot navigation of the virtual camera.

Note that the autopilot navigation execution unit 160 may perform control so as to change the position and orientation of the virtual camera instantaneously or gradually. In a case in which the virtual camera position/orientation is gradually changed, the autopilot navigation may be stopped at the point in time when the photographic subject drawing ratio exceeds the threshold in the course of the autopilot navigation, for example. Furthermore, the autopilot navigation execution unit 160 may perform the autopilot navigation so as to track the photographic subject that was shown last. In addition, such modifications may be combined as appropriate. Furthermore, the determination of whether the autopilot navigation condition is fulfilled does not necessarily have to be performed when the virtual camera is controlled. For example, the information processing apparatus 103 may restrict the virtual camera direction so as to be within a specific range (for example, within a range in which the elevation angle equals or exceeds a predetermined value) in response to the movement of the virtual camera to the outside of the movable range.

As described above, according to the third embodiment, if it is determined that the user has lost track of the virtual camera position and orientation, the virtual camera is subjected to autopilot navigation so that the virtual camera position/orientation can be identified. Accordingly, the user can continue operating the virtual camera.

Other Embodiments

Embodiments of the present invention have been described up to this point. However, the present invention is not limited to these specific embodiments, and various embodiments that do not depart from the scope of the invention are also included in the present invention. Furthermore, parts of the above-described embodiments can be combined, as appropriate.

For example, while the information processing apparatus 103 and the image generating server 102 are described as separate devices in the above-described embodiments, a configuration in which one server is used for the information processing apparatus 103 and the image generating server 102 may be adopted, or a configuration in which the information processing apparatus 103 and the image generating server 102 are internally divided into a plurality of servers and logically constitute one device.

Furthermore, while the above-described embodiments are described based on an example in which the virtual camera is moved to under the ground, the present invention is not limited to this, and any operation suffices as long as the operation is involved in the movement from the inside to the outside of the movable range. For example, if the inside of the shape of a stadium is defined as the inside of the movable range, the operation may be that for the movement or orientation of the virtual camera beyond the spectator seats or the ceiling of a dome.

Furthermore, description is provided in the above-described embodiments using the concept of virtual camera for convenience. However, it should be noted that the position and orientation of the virtual camera can be rephrased as the position and direction of the virtual viewpoint, as appropriate.

Furthermore, in the above-described embodiments, description is provided mainly focusing on an example in which a constraint is imposed in advance, and the constraint is cancelled if a predetermined condition is fulfilled. However, the present invention is not limited to this example. For example, a configuration may be adopted such that no constraint is imposed under normal conditions, and a constraint is imposed if a predetermined condition is fulfilled. In other words, a configuration may be adopted such that a constraint becomes valid if a predetermined condition is fulfilled, and the constraint becomes invalid if the predetermined condition is not fulfilled.

According to the above-described embodiments, a virtual camera can be operated beyond a constraint while reducing the possibility of losing track of the virtual camera position and orientation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus comprising:
one or more memories storing instructions; and
one or more processors executing the instructions to:
specify a position of a virtual viewpoint and a direction of a view from the virtual viewpoint;
accept input to move the virtual viewpoint corresponding to a virtual viewpoint image; and
restrict a movement of the virtual viewpoint to a specific region based on the direction of the view from the virtual viewpoint,
wherein in a case where the movement of the virtual viewpoint is continuously restricted for a predetermined time, control for moving the virtual viewpoint to a predetermined position is performed, and
wherein the movement of the virtual viewpoint to the specific region is restricted in a case where an angle formed by the direction of the view from the virtual viewpoint and a normal direction of a boundary surface of the specific region is within a specific angle range, and the movement of the virtual viewpoint to the specific region is not restricted in a case where the angle formed by the direction of the view from the virtual viewpoint and the normal direction of the boundary surface of the specific region is not within the specific angle range.

2. The control apparatus according to claim 1, wherein the specific angle range is a range in which an angle formed by the normal direction of the boundary surface of the specific region and the direction of the view from the virtual viewpoint equals or falls below a predetermined value.

3. The control apparatus according to claim 1, wherein the specific angle range is a range in which an elevation angle of the direction of the view from the virtual viewpoint equals or exceeds a predetermined value.

4. The control apparatus according to claim 1, wherein the specific angle range is a range in which a proportion of a field of view of the virtual viewpoint that is occupied by the specific region equals or exceeds a threshold.

5. The control apparatus according to claim 1, wherein the virtual viewpoint image is generated based on a plurality of captured images that are obtained by capturing images from multiple directions using a plurality of image capturing devices.

6. The control apparatus according to claim 5, wherein the specific region is a region included in at least one of the plurality of captured images.

7. The control apparatus according to claim 1, wherein restricting the movement of the virtual viewpoint includes control for invalidating input for moving the virtual viewpoint.

8. The control apparatus according to claim 1, wherein restricting the movement of the virtual viewpoint includes control for reducing a moving speed of the virtual viewpoint.

9. The control apparatus according to claim 1, wherein restricting the movement of the virtual viewpoint includes control for delaying a start of the movement of the virtual viewpoint to an outside of the specific region.

10. The control apparatus according to claim 1, wherein the specific region is a region in an underground, in a case where an elevation angle of the direction of the view from the virtual viewpoint is less than a predetermined value, the movement of the virtual viewpoint is restricted so that the virtual viewpoint does not move into the specific region in accordance with input for moving the virtual viewpoint vertically downward.

11. The control apparatus according to claim 1, wherein the direction of the view from the virtual viewpoint is restricted if the virtual viewpoint is positioned inside the specific region.

12. The control apparatus according to claim 1, wherein the direction of the view from the virtual viewpoint is changed to a direction within the specific angle range in a case where a predetermined condition is fulfilled under a situation in which the virtual viewpoint is positioned outside the specific region and the direction of the view from the virtual viewpoint is inside the specific angle range.

13. The control apparatus according to claim 1, wherein the position of the virtual viewpoint is changed to a position inside the specific region in a case where a predetermined condition is fulfilled under a situation in which the virtual viewpoint is positioned inside the specific region.

14. A control method comprising:
specifying a position of a virtual viewpoint and a direction of a view from the virtual viewpoint;
accepting input to move the virtual viewpoint corresponding to a virtual viewpoint image; and
restricting a movement of the virtual viewpoint to a specific region based on the direction of the view from the virtual viewpoint,
wherein in the restricting, the movement of the virtual viewpoint to the specific region is restricted in a case where an angle formed by the direction of the view from the virtual viewpoint and a normal direction of a boundary surface of the specific region is within a specific angle range, and the movement of the virtual viewpoint to the specific region is not restricted in a case where the angle formed by the direction of the view from the virtual viewpoint and the normal direction of the boundary surface of the specific region is not within the specific angle range.

15. A computer-readable storage medium storing a computer program for causing a computer to perform a control method comprising:
specifying a position of a virtual viewpoint and a direction of a view from the virtual viewpoint;
accepting input to move the virtual viewpoint corresponding to a virtual viewpoint image; and
restricting a movement of the virtual viewpoint to a specific region based on the direction of the view from the virtual viewpoint,
wherein in the restricting, the movement of the virtual viewpoint to the specific region is restricted in a case where an angle formed by the direction of the view from the virtual viewpoint and a normal direction of a boundary surface of the specific region is within a specific angle range, and the movement of the virtual viewpoint to the specific region is not restricted in a case where the angle formed by the direction of the view from the virtual viewpoint and the normal direction of the boundary surface of the specific region is not within the specific angle range.

16. The control apparatus according to claim 1, wherein in a case where the movement of the virtual viewpoint is continuously restricted for the predetermined time, control for moving the virtual viewpoint to the predetermined position is performed.

17. The control apparatus according to claim 16, wherein the predetermined position is a position outside the specific region.

18. The control apparatus according to claim 1, wherein in a case where the movement of the virtual viewpoint is continuously restricted for the predetermined time, the direction of the view from the virtual viewpoint is changed to the specific angle range.

19. The control apparatus according to claim 1, wherein the specific region is a region whose boundaries are planes that are specified based on a plurality of coordinate axes in a virtual space.

20. The control apparatus according to claim 1, wherein the specific region is a region determined based on a three-dimensional model.

21. The control apparatus according to claim 20, wherein the specific region is a region in a three-dimensional space in which a three-dimensional model of an object is present.

22. The control apparatus according to claim 21, wherein the region in which the three-dimensional model of the object is present is a region in which at least one of a three-dimensional model of a foreground object, a three-dimensional model of a background object, and a three-dimensional model of a virtual object is present.

* * * * *